Patented Nov. 21, 1922.

1,435,928

UNITED STATES PATENT OFFICE.

HERMAN B. KIPPER, OF MUSKEGON, MICHIGAN.

PROCESS OF INCREASING SPEED IN CHEMICAL REACTIONS.

No Drawing.    Application filed January 3, 1920.  Serial No. 349,288.

*To all whom it may concern:*

Be it known that I, HERMAN B. KIPPER, a citizen of the United States of America, residing at Muskegon, in the county of Muskegon and State of Michigan, have invented certain new and useful Improvements in Processes of Increasing Speed in Chemical Reactions, of which the following is a specification.

There are many chemical reactions which, if their speed could sufficiently be increased, would become commercially advantageous, although now merely scientifically interesting. The reactions which I have under consideration are not those occurring in solution but high temperature reactions between solids, or between a solid and a fused salt, or liquid, or between a solid and a gas. This class of reactions may occur between different compounds in the same phase of condition or between different phases of matter. In general, however, it will be noted that the reactions are not those occurring between substances in solution.

In my Patent No. 1,250,471 of December 11th, 1917, a process is described for the manufacture of a double sodium iron sulphate and from this compound, by admixture of sodium chloride, or salt, in the presence of oxygen at a high temperature, the final production of chlorine.

The reactions for the production of chlorine occur according to the following equations:

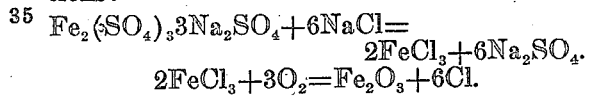
$$2FeCl_3 + 3O_2 = Fe_2O_3 + 6Cl.$$

The reactions have been brought practically to completion in a long lined cylinder heated to 400° to 600° C. but the time required to produce complete reaction is so excessive as to partially negative the commercial value of the reaction, and therefore the process of which it is a basis.

The sodium ferric sulphate at the temperature of reaction is practically solid and this is also true of the sodium chloride or salt. Ferric chloride is in the fused state at the operating temperature but is rapidly decomposed to chlorine and ferric oxide which is a solid even at a much higher temperature.

The slow speed of reaction would appear to be caused by imperfect contact of the reacting substances. Even the most thorough grinding and mixing of the reaction substances prior to their passage through the reaction cylinder does not overcome the slowness of the speed of reaction. I have found, however, that if the reaction cylinder itself is filled with grinding material that the speed of reaction is tremendously increased.

For the reaction in question I have employed as a grinding material either porcelain balls or balls made of iron oxide, sand and cement. Flint pebbles cannot be used since they very rapidly break to pieces at the temperature of reaction. Iron balls also cannot be used since they interfere with the reactions themselves, possibly because of the reducing quality of the metal.

In another reaction, however, in which I have also found that the use of grinding materials in the reaction cylinder greatly increases the speed of reaction, iron balls may most advantageously be used. The reaction which I refer to is one employed in the manufacture of cyanide compounds and from these of ammonia. My Patent No. 1,322,026 covers an apparatus for carrying out this reaction. In this reaction I employ a mixture of coke, ferric oxide, sodium, potassium and calcium carbonates, or one of these carbonates alone, or a binary mixture of any two of them, as the starting substances of reaction. I have also used a dolomitic stone in place of limestone so that in general mixture of salts of the alkaline and alkaline earth metals may be used.

Another reaction in which I have successfully used my process in order to decrease the time in which to bring about completion of the reaction is that occurring between iron sulphate and calcium carbonate at high temperatures. This latter reaction is used in the manufacture of red pigments and chemically may be represented as follows:

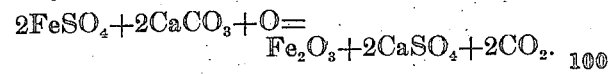

Calcium oxide, or lime, or calcium hydrate, or hydrated lime may be used in place of calcium carbonate.

Iron or preferably porcelain balls have been used by me in carrying out the above reaction according to my process. The final product is a pigment material. Another great advantage gained by my process is the imparting of a very even color to the pigment product. Ordinarily some of the reaction materials become caked. Naturally heat penetration to the center of one of the "caked" masses occurs very long after the finer particles have been heated to the proper temperature. As the color of the finished product is dependent upon the temperature to which it has been heated as well as on the time of heating an uneven color is caused by this caking. In preventing caking by my process unevenness of color is also prevented.

I have mentioned the use of my process in hastening the speed of reaction between the double salt, ferric sodium sulphate and sodium chloride to produce chlorine. I have used the process in the production of chlorine from ferrous and ferric sulphates and sodium chloride especially successfully in the presence of pure oxygen. I also used the process to decompose iron sulphate to ferric oxide and the oxides of sulphur. The ferric oxide thereby formed is suitable for use as a pigment. The process has special advantage in that the ferrous and ferric sulphates are very completely decomposed so that the pigment, ferric oxide, does not require washing as is ordinarily the case occurring from the decomposition of these sulphates.

One of the reactions which has been used for many years in the manufacture of sodium sulphate and hydrochloric acid is that which takes place between salt, sulphur dioxide, oxygen and steam according to the following equation:

$$SO_2 + 1/2 O_2 + 2NaCl + H_2O = Na_2SO_4 + 2HCl.$$

By the present or Hargreaves process the reaction is carried out in large vessels and with the use of the counter-current principle. The process of manufacture, however, which has been more extensively employed in Europe is a very slow one and requires, I understand, some three weeks for completion. I believe that by my method of operation it may be reduced for the commercial scale of manufacture to as many hours.

In Patent No. 1,255,020 I describe a process for the manufacture of salt cake, or sodium sulphate, chlorine and iron pigments. The process utilizes the following reaction:

$$Fe_2O_3 + 6NaHSO_4 = Fe_2(SO_4)_3 + 3Na_2SO_4 + 3H_2O.$$

The catalyst, or iron oxide, as described in the above patent is incorporated into balls or rods with cement and sand. To replace the sulphur dioxide gas and half of the oxygen used according to the reaction noted I have also employed sulphur trioxide. I also replaced the iron oxide balls by finely divided iron oxide and porcelain balls, when employing either sulphur dioxide, or trioxide, and oxygen. Finally, however, I have employed the following reaction in conjunction with this process:

$$6NaCl + 3SO_3 + 3O = 3Na_2SO_4 + 3Cl_2.$$

The reaction is not new. It is reversible dependent upon gas concentrations, temperatures, etc.

Another reaction on which I have tried out my process successfully is that occurring between calcium carbide and nitrogen to form calcium cyanamid.

In the manufacture of sodium sulphate and hydrochloric acid from salt and sulphuric acid, and also in the manufacture of nitric acid and acid sodium sulphate from sodium nitrate and sulphuric acid as well as in the manufacture of sodium sulphate and hydro-chloric acid from sodium chloride and acid sodium sulphate my process has been successfully used.

In the Le Blanc soda processes sodium sulphate, carbon and calcium carbonate are heated to produce sodium carbonate and calcium sulphide. I have used my process for carrying out the reactions in the said processes.

I have also found that my processes may be advantageously used in the manufacture of soluble phosphates from phosphate rock with sulphuric acid. I have used my process in the manufacture of ultra-marine and a sulphide dye by fusion of an organic compound with sulphur and sodium sulphide, and special advantages are expected in this field.

Temperatures of 100° to 400° C. may be employed for these processes. I have made a sulphur brown dye from a ligno-sulphonic acid, secured as a by-product from paper manufacture, sodium sulphide and sulphur at temperatures of 100° to 200° C., which when used as a dye for woolen cloth is very fast to light and washing.

In the manufacture of ferric sulphate from iron oxide and sulphur trioxide or from iron oxide, sulphur dioxide and oxygen my process has also been found to offer advantages. Likewise in the conversion of sulphur dioxide and oxygen (air) to sulphur trioxide I employed the process successfully. I have used porcelain balls and finely divided iron oxide for this conversion at temperatures ranging from 400° to 700° C. In this as in the other application to which my process has been employed, the reaction cylinder has been either thoroughly insulated so that no external heating was required, or when I have considered external heating more advantageous, it has been employed.

The reaction cylinders have been made of iron and have been lined with concrete, fire or chrome brick, and a concrete made of sand, iron oxide and cement, as deemed chemically most resistant to the reaction.

I do not wish to confine my process merely to the use of the above linings, however. Any suitable lining may be used.

Furthermore, I do not wish to limit the use of my process merely to the reactions described but wish to include its application to any so-called "dry re-actions," especially at high temperatures, of which I have given a number of typical examples, nor do I wish to limit the grinding material merely to balls or to material in the spherical shape: Solid cylinders or rods or hollow cylinders or pipes may of course be used as well as materials in the elliptical shape, etc. Also the material most suitable to the reaction may be used. I have mentioned the use of iron, and porcelain balls as well as those made from a special mixture, each specific material being most suitable to its particular reaction, but copper or any of many other substances or combination of these substances may be utilized dependent on the character of the materials themselves entering the reaction or upon the other factors. The reaction vessels also need not be cylindrical or do they need to move themselves. Many other shapes of vessels may be employed, and the balls or other grinding materials may be driven by arms, or otherwise, in which cases their grinding action would not be produced by the motion of the reaction vessel itself.

What I claim and desire to secure by Letters Patent is:

1. In a process of speeding and aiding the completion of chemical reaction occurring when ferrous sulphate is heated to a temperature of over 400° C. to form ferric oxide and the oxides of sulphur, the step of subjecting the reaction substances to grinding and mixing actions during the period of reaction.

2. In a process of speeding and aiding the completion of chemical reaction occurring when ferrous sulphate is heated to a temperature of over 400° C. to form ferric oxide and the oxides of sulphur, the step of subjecting the reaction substances to the simultaneous grinding and mixing action of tube (ball) mills during the period of reaction.

In testimony whereof I affix my signature in presence of two witnesses.

HERMAN B. KIPPER.

Witnesses:
H. E. JONES,
MAURITZ E. PETERSEN.